Feb. 8, 1927.
J. P. HASSELBERGER
1,617,051
VEHICLE SIGNAL LAMP
Filed June 27, 1923
3 Sheets-Sheet 1
Fig. 1.
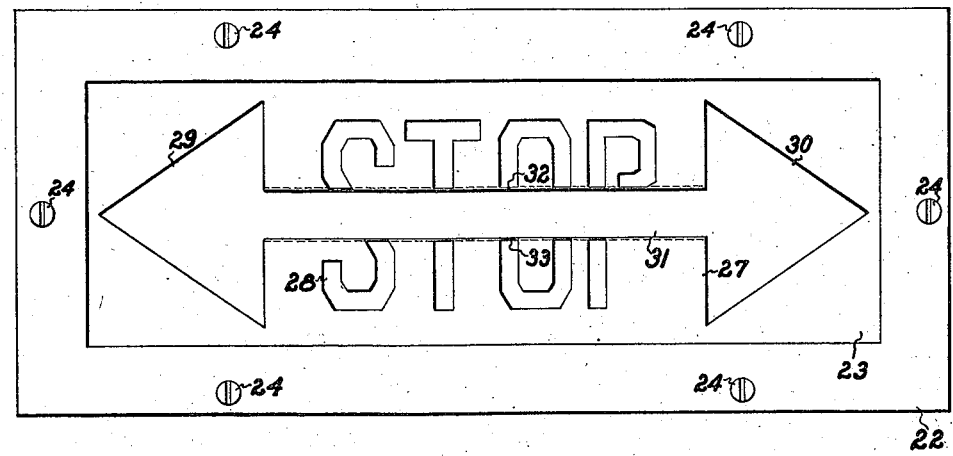
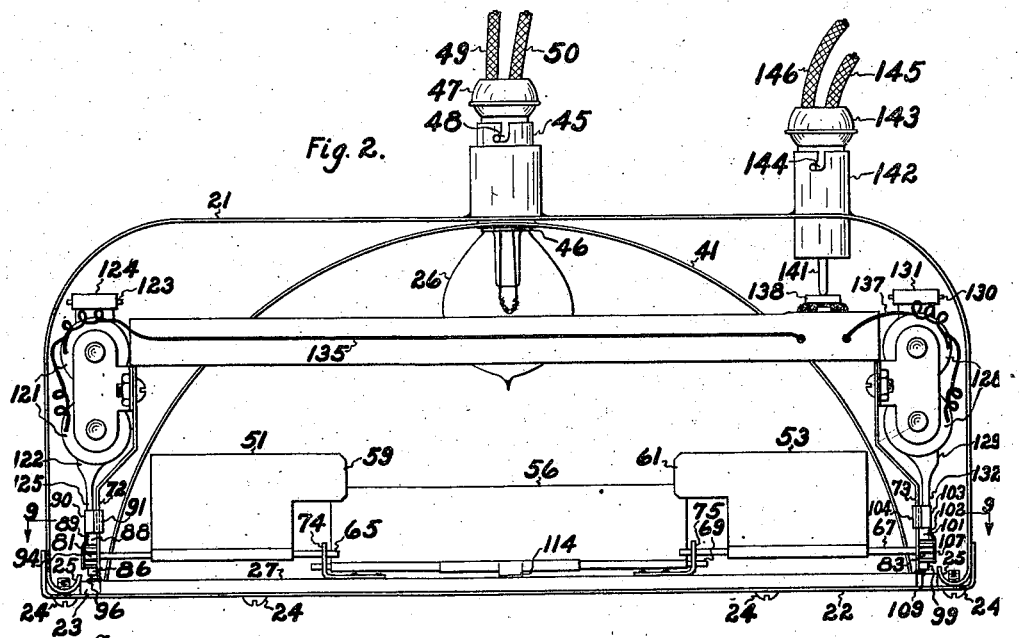
Inventor:
John P. Hasselberger

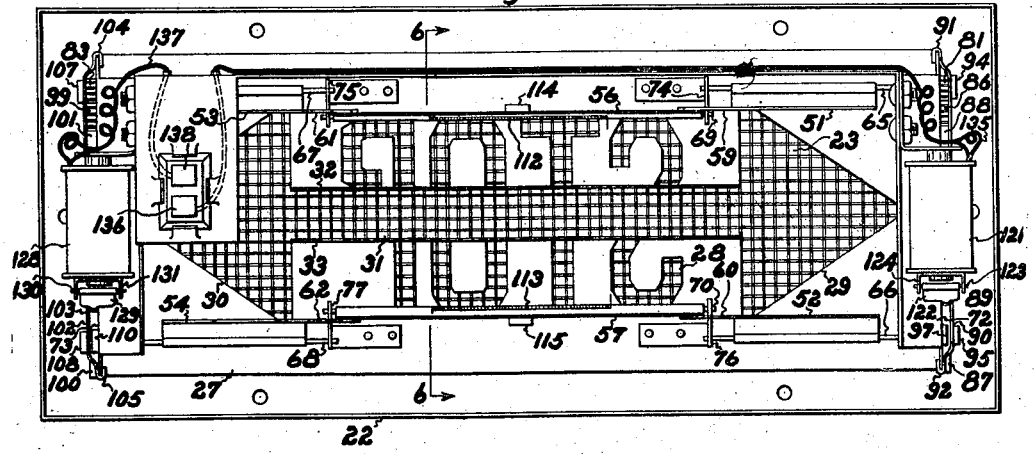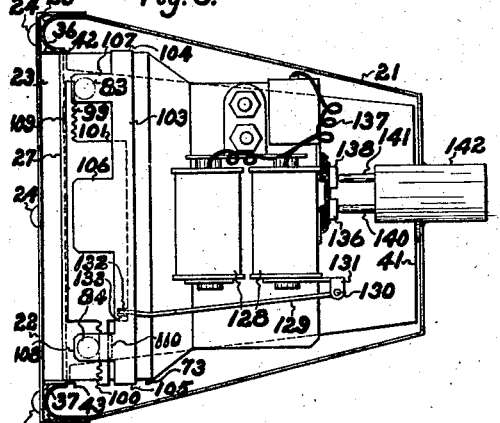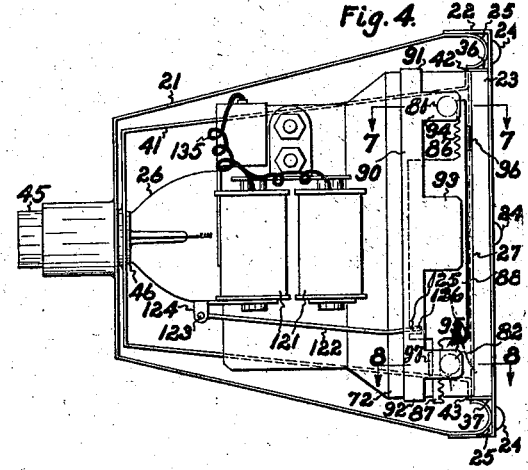

Feb. 8, 1927.
J. P. HASSELBERGER
1,617,051
VEHICLE SIGNAL LAMP
Filed June 27, 1923
3 Sheets-Sheet 3

Inventor:
John P. Hasselberger

Patented Feb. 8, 1927.

1,617,051

UNITED STATES PATENT OFFICE.

JOHN P. HASSELBERGER, OF CHEVIOT, OHIO.

VEHICLE SIGNAL LAMP.

Application filed June 27, 1923. Serial No. 647,970.

My invention relates to vehicle signal lamps for use, for instance, on automobiles to indicate directions of movement to be taken by the vehicle and, selectively, to indicate intended stopping of the vehicle.

It is the object of my invention to provide novel means whereby to indicate intended direction of travel of the vehicle; further, to provide novel means to indicate intended stopping of the vehicle; further, to provide novel means whereby the mechanism for indicating stopping of the vehicle renders the mechanism for indicating direction of travel inoperative; further, to provide novel shutter means selectively operated for indicating opposite directions of intended travel of the vehicle; further, to provide novel shutter means for the stop signal arranged to be operated by the shutter means of the direction signals; and, further, to provide novel means for selectively controlling said shutter means and an electric lamp whereby the shutter means may be selectively employed for indicating the direction of intended travel or rendered inoperative for indicating stopping of the vehicle, and whereby lighting of the electric light is caused during signal indications for direction or for stopping.

The invention will be further readily understood from the following description and claims, and from the drawings, in which latter:

Fig. 1 is a rear elevation of my improved device.

Fig. 2 is a plan view of the same with the top of the casing and the top of the reflector removed for better illustration of parts.

Fig. 3 is an end elevation of my improved device with the end wall of the casing removed for better illustration of parts.

Fig. 4 is an end elevation of my improved device, taken from the opposite end, with the end wall of the casing and the end wall of the reflector removed for better illustration of parts.

Fig. 5 is a front elevation of my improved device, with the body of the casing and the reflector removed for better illustration of parts.

Fig. 6 is a vertical cross-section taken in the plane of the line 6—6 of Fig. 5, showing a detail of the shutter mechanism, partly broken away.

Fig. 7 is a sectional view of a detail of the shutter mechanism, taken on the line 7—7 of Fig. 4.

Fig. 8 is a similar view, taken on the line 8—8 of Fig. 4.

Figure 9:
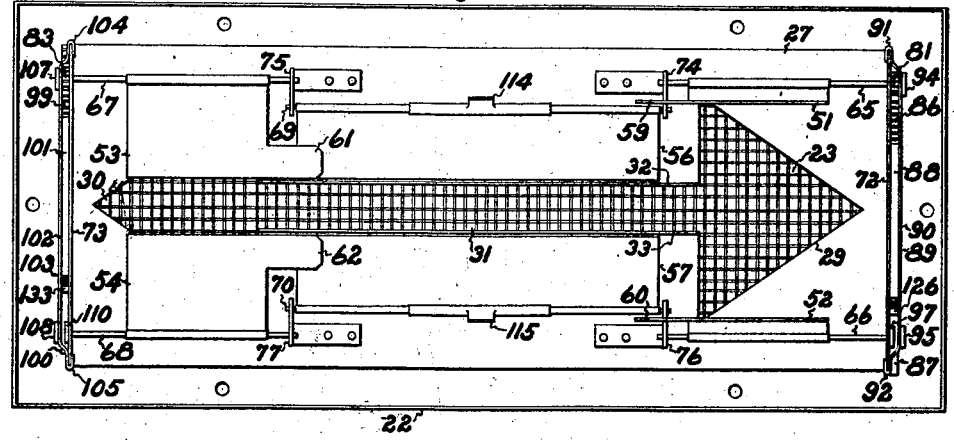
Fig. 9 is a front elevation of my improved device, taken on the line 9—9 of Fig. 2, with the body of the casing and the reflector removed, and showing the shutter mechanism operated for indicating intended turning of the vehicle to the left.

The body of the lamp casing is indicated at 21. It is provided with a closure comprising a rim 22 and a lens 23, shown provided with light-diffusing cross-slots. Screws 24 are arranged to pass through the rim and are threaded into inturned flanges 25 of the body of the casing.

Signals are provided in connection with the lens so that the rays of light from a source of light, indicated as an electric incandescent bulb 26, may be projected therethrough to show the signals. These signals are shown as formed in a plate 27 and include, in the present instance, the word "Stop", shown at 28, two arrow-heads, shown respectively at 29 and 30, projecting in opposite directions, and a shank 31 connecting the arrow-heads and imposed across the word "Stop". Each of said arrow-heads comprises side wings at the respective sides of the respective ends of the shank. The margins of the plate at the shank have inwardly bent flanges 32, 33, to strengthen said margin and connect the interrupted portions of the letters. These signals may, if desired, be part of the lens or formed in the lens or painted or otherwise colored directly upon the lens, but I show them as formed in the separate plate 27.

The plate 27 is at its upper and lower edges provided with flanges 36, 37. The lens is shown received in the channel formed by these flanges and the plate, the ends of the lens being positioned by the inturned flanges 25 of the body of the casing.

A reflector 41 is located in the casing, the upper and lower rear edges thereof being provided with flanges 42, 43, received against the signal plate. The rear end of the reflector may have a double-ended socket 45 secured thereto, the inner end of which is arranged to receive the plug 46 of the incandescent lamp, and the outer end of which is arranged to receive the releasable plug 47, the connections of the respective plugs with the socket being by means of usual bayonet slot and pin connections 48. The interior of the socket is provided with usual double contact posts for conducting the electricity received by the electric wires 49, 50, by means of said contact posts to the filament of the electric bulb in usual and well-known manner.

Figure 10:
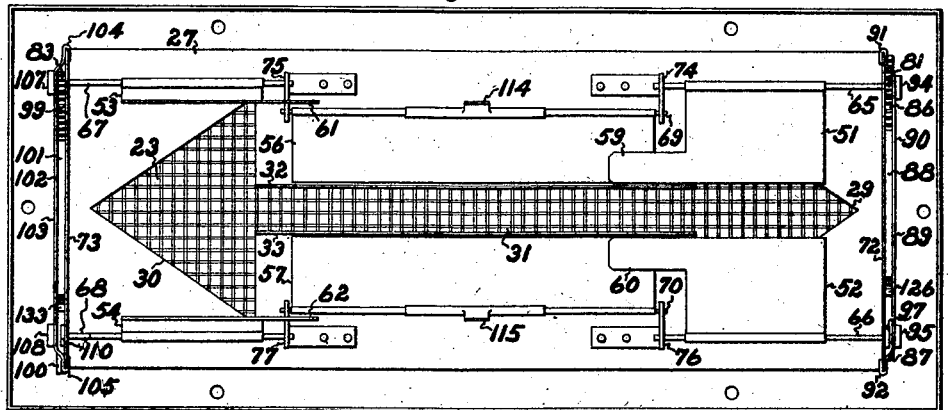
Fig. 10 is a similar view indicating an intended turning to the right.

There is a pair of shutters 51, 52, which is arranged to cover the directional portions of one of the direction signals, as shown in Fig. 10, and a pair of shutters 53, 54, which is arranged to cover the directional portion of the other direction signal, as shown in Fig. 9.

There is a further pair of shutters 56, 57, which is arranged to cover the stop portion of the stop signal, instanced as covering the word "Stop." The pair of shutters 51, 52, are provided with tongues 59, 60, which coact with the shutters 56, 57, and the pair of shutters 53, 54, are provided with a pair of tongues 61, 62, which also coact with the shutters 56, 57.

The construction and arrangement of the shutters is such that when the shutters 51, 52, are operated to cover the directional portion of the arrow-head with which they cooperate for indicating intended turning in one direction, the tongues 59, 60, thereon operate the shutters for obscuring the stop signal. When the directional shutters 53, 54, are operated to cover the directional portion of the directional signal with which they co-operate for indicating intended turning in the opposite direction, the tongues 61, 62, thereon operate the shutters for obscuring the stop signal.

With this arrangement, when none of the shutters is operated, and the electric bulb is illuminated, a "Stop" signal is indicated, as shown in Figs. 1, 2 and 5. When one of the directional shutter means is operated, travel in the one direction is indicated, as shown in Fig. 9, indicating a turn to the left, and when the other directional shutter means is operated, travel in its opposite direction is indicated, as shown in Fig. 10, indicating a turn to the right.

The shutters 51, 52, are fixed respectively to shafts 65, 66, the shutters 53, 54, are respectively fixed to shafts 67, 68, and the shutters 56, 57, are respectively fixed to shafts 69, 70.

In the present instance, the signal plate is provided at its respective ends with rearward flanges 72, 73, and is, intermediate of its ends, provided with bearing brackets 74, 75, 76, 77, respectively riveted thereto.

The shaft 65 is at its respective ends provided with bearings respectively in the end flange 72 and the bearing bracket 74. The shaft 66 is at its respective ends provided with bearings in said flange and the bearing bracket 76. The shaft 67 is at its respective ends provided with bearings in the rearwardly extending flange 73 and the bearing bracket 75. The shaft 68 is at its respective ends provided with bearings in said flange and the bearing bracket 77. The shaft 69 is at its respective ends provided with bearings in the bearing brackets 74, 75. The shaft 70 is at its respective ends provided with bearings in the bearing brackets 76, 77.

The shaft 65 has a pinion 81 rigid thereon. The shaft 66 has a pinion 82 rigid thereon. The shaft 67 has a pinion 83 rigid thereon. The shaft 68 has a pinion 84 rigid thereon. The pinions 81 and 82 are respectively meshed by racks 86, 87, located on a rack-bar 88, the pinions and the rack-bar operating in a slot 89 formed between the rearwardly extending flange 72 as one wall thereof and a retaining plate 90 as the other wall thereof, the retaining plate being fixed to said flange by being formed with clips 91, 92, at its respective ends clamped to said flange.

The retaining plate is provided with a lip 93 arranged to project over a considerable portion of the body of the rack-bar to cause the racks to operate in true paths with relation to their pinions. It is also provided with lips 94, 95, received over the respective pinions 81, 82, at their meshing positions with the rack-bars. The racks are held toward the pinions by means of lugs 96, 97, struck up from the flange 72.

The pinions 83 and 84 respectively mesh with racks 99, 100, located on a rack-bar 101. The pinions and the rack-bar operate in a slot 102 formed between the rearwardly extending flange 73, as one wall thereof, and a retaining plate 103 as the other wall thereof, the retaining plate being fixed to said rearwardly extending flange by being formed with clips 104, 105, at its respective ends clamped to said flange.

The retaining plate is provided with a lip 106 arranged to project over a considerable portion of the rack-bar to cause the racks to operate in true paths with relation to their pinions. It is also provided with lips 107, 108, received over the respective pinions 83, 84, at their meshing portions with the rack-bars. The racks are held toward the pinions by means of lugs 109, 110, struck from said flange 73.

The shutters are normally held in retracted position, that is, so that the rays of light from the light bulb may pass unobstructingly through the signal portions, being normally retracted by helical springs 112, 113, about the shafts 69, 70, one of the ends of each of the springs being received against the inner face of the signal plate, the other ends of said springs being received against the shutters 56, 57, respectively, for normally retracting said shutters and thereby through the medium of the tongues on the end shutters also retracting said end shutters. The end shutters are further retracted by the weights of the rack-bars and the armatures coacting therewith and hereafter described. The shutters 56, 57, are respectively provided with heels 114, 115, arranged to strike the signal plate for limiting retracting movement of the shutters.

Means are provided for operating the shutters, electrical means being shown for the purpose, controlled by the driver of the automobile. Thus, there are electric translating devices 121, shown as electro-magnets, which control an armature 122 pivoted at 123 to a bracket 124, the armature having a finger 125 thereon received in a slot 126 in the rack-bar 88 for controlling the pair of shutters 51, 52.

There is an electric translating device 128, shown as electro-magnets, for controlling an armature 129, pivoted at 130 to a bracket 131, and having a finger 132 thereon which is received in a slot 133 in the rack-bar 101, for operating the pair of shutters 53, 54.

An electric conductor 135 connects the electro-magnets 121 with a terminal 136. An electric conductor 137 connects the electro-magnets 128 with an electric terminal 138. Posts 140, 141, are in a usual socket 142, in which they are spring-pressed in usual manner toward said terminals. A usual plug 143 has connection with said socket, as by means of bayonet slot and pin connection 144, electric conductors 145, 146, forming connection by means of said plug with the posts 140, 141.

The electric conductors 145, 146 (see Fig. 11), connect with switches 147, 148. Electric conductors 149, 150, connect said respective switches with contacts 151, 152. The electric conductor 49, connecting with one terminal of the electric light bulb, connects with a switch 153. An electric conductor 154 and a branch thereof 155 connect the electric conductor 49 with contacts 156, 157.

An electric conductor 161 and a branch thereof 162 connect the switch 153 with contacts 163, 164. An electric conductor 165 connects the electric conductor 161 with one terminal of a source of electric energy, instanced as a storage battery 166. The other terminal of the storage battery is connected by means of an electric conductor 167 with a common return or ground, indicated at 168, which may be instanced as the frame of the automobile or the lamp. The electric conductor 50 is also connected with said ground, and electric conductors 169, 170, connect the electro-magnets with said ground.

The switches 147, 148, 153, are connected by an insulated bar 171 for operating the same in unison, so as to close the switches 147, 148, and open the switch 153, or close the switch 153 and open the switches 147, 148. This bar is provided with a slot 172 in which a stationary pin 173 is located for limiting the movements of the bar.

The bar is preferably operated by an element connected with the brake mechanism of the vehicle, instanced as the tension-rod 175, connecting the foot-treadle for the service brakes with one of the operating members of said brakes, this connection being had preferably by means of a spring 176, shown as a helical spring, the respective ends of which are connected with said rod and with said bar.

The operation is such that when the driver applies the service brakes, the tension-rod 175 is moved axially, thereby moving the spring with it during a part of its movement and closing the switch 153 and opening the switches 147, 148, in which position the other end of the slot 172 strikes the pin 173 and stops movement of these switch-bars. The movement of the tension-rod 175 may, however, continue, the spring yielding to such continued movement. Upon retraction of the brake pedal, the spring will again change the positions of the switch-bars into normal relations.

If desired, the spring 176 may be so arranged that the switch 153 is closed and the switches 147, 148, are opened only after material movement of the brake-pedal, so that said switch-bar may not be moved during the ordinary light application of the brake-lever as is customary when turning corners.

Figure 11:
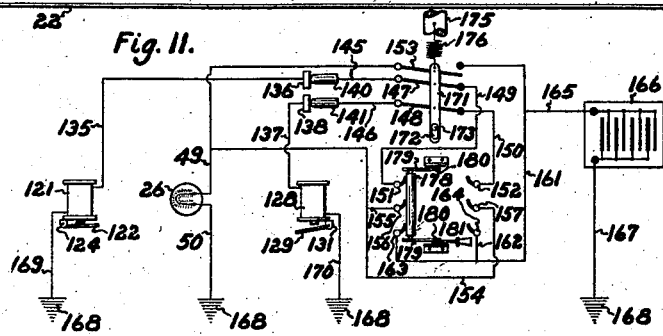
Fig. 11 is a diagrammatic view showing the electrical connections.

A bus-bar 178 is mounted on arms 179 rocking on pivots 180 and operated by a handle 181. The bus-bar is arranged to connect the contacts 151, 156, 163, as shown in Fig. 11. It may be swung on its pivots by downward swinging movement of the handle so that the bus-bar will electrically contact the contacts 152, 157, 164. The bus-bar may also be placed in neutral position out of contact with all said contacts.

The bus-bar and its contacts may be suitably placed in a switch-box in convenient position for the driver of the vehicle, for instance, on the steering post, on the steering wheel, or on the instrument board, within ready reach, so that he may move the bus-bar by means of the lever in either direction to contact with either set of contacts, or for neutral position.

If, for instance, the driver is proceeding along a street and desires to turn into a side street toward the right, he will move the bus-bar to the position shown in Fig. 11, by swinging the handle under the bus-bar to the right.

In this relation, the electric current passes from the battery through the conductors 165, 161, the contact 163, the bus-bar, the contact 156, the electric conductors 155, 154 and 49 to the electric light bulb for lighting the bulb. Electric current will also pass from the bus-bar, the contact 151, the electric conductor 149, the switch 147, the electric conductor 145, the post 140, the contact 136, the electric conductor 135, and the electro-magnet 121 for attracting the armature 122, as shown in Fig. 11, and thereby actuating the shutters 51, 52, which by means of their tongues 59, 60, actuate the shutters 56, 57, for covering the indicating portions of the arrow-head 29, as shown in Fig. 10, and covering the stop portion of the stop-signal, so that the light from the electric light bulb will be projected through the arrow-head at the right of the automobile, looking in proceed direction, and displaying the shank of the arrow toward the left, for indicating to a following vehicle the intended direction of travel of the vehicle toward the right.

If the driver intends to turn to the left, the bus-bar is swung in the opposite direction, whereupon the electric energy is caused to pass through the battery, the electric conductors 165, 161, 162, the contact 164, the bus-bar, the contact 157, the electric conductors 154 and 49, and the electric lamp for illuminating the signal. The current also passes through the bus-bar, the contact 152, the electric conductor 150, the switch 148, the electric conductor 146, the post 141, the contact 138, the electric conductor 137, and the electro-magnet 128, attracting the armature 129, and operating the rack-bar 101, and thereby swinging the shutters 53, 54, of the right-hand arrow-head, looking in proceed direction, which in turn, by means of their tongues 61, 62, swing the shutters 56, 57, for obstructing the stop portion of the stop-signal, and showing the arrow pointing to the left, looking in proceed direction, as shown in Fig. 9, to indicate to the driver in the rear the intended course of travel of the vehicle to the left.

If desired, a similar signal may be employed so as to project toward the front of the vehicle, to indicate the intended course of travel of the vehicle in advance of the vehicle. When the signal means projecting in the front of the vehicle is employed, the stop portion of the signal and its accompanying shutters may be omitted.

If it is desired to bring the vehicle to a stop or decrease its speed to a material extent, the driver applies his service brake by means of his foot-treadle, whereby the switch 153 is closed for lighting the electric light. This will illuminate the stop signal for indicating intended stopping of the vehicle. If during such material application of the brakes, either direction signal should be in operative relation for indicating a change of direction, the stop signal, which is the more important signal, will nullify the operative relation in the direction signal, for the reason that the application of the brakes not only closes the switch 153 for lighting the electric light, but also opens the switch 147, 148, so as to interrupt the circuit for both the electro-magnets 121, 128, thereby showing a full stop signal, all the shutters being then open as shown in Figs. 1, 2 and 5, the direction indicating shutters either remaining in, or automatically returning to neutral position.

Having thus fully described my invention, what I claim as new, and desire to secure by Letters Patent, is:

1. In a vehicle signal lamp, the combination of a lens and means in connection therewith to normally include light transmitting oppositely projecting separated arrow-heads including side wings, the word Stop and a shank imposed across said word between said arrowheads, end pivoted shutters arranged to cover said side wings of said respective arrow-heads when said shutters are closed, the proximate edges of said end pivoted shutters spaced apart when said shutters are so closed to form elongated spaces between said shutters for light transmission therethrough whereby the middle portions of said arrow-heads appear as continuations of said shank, and intermediate pivoted shutters arranged to cover the portions of said word at the respective sides of said shank and leaving said shank exposed for light transmission therethrough when said last-named shutters are closed, an illuminating device in rear of said lens, and means mounting said shutters to swing between said illuminating device and said lens.

2. In a vehicle signal lamp, the combination of a lens and means in connection therewith to normally include light transmitting oppositely projecting separated arrow-heads including side wings, the word Stop and a shank imposed across said word between said arrow-heads, an illuminating device in rear of said lens, normally open end pivoted shutters arranged to cover said side wings of said respective arrow-heads when said shutters are closed, the proximate edges of said end pivoted shutters spaced apart when said shutters are so closed to form elongated spaces between said shutters for light transmission therethrough whereby the middle portions of said arrow-heads appear as continuations of said shank, and normally open intermediate pivoted shutters arranged to cover the portions of said word at the respective sides of said shank and leaving said shank exposed for light transmission therethrough when said last-named shutters are closed, operative connections between said end shutters and said intermediate shutters for operating said intermediate shutters in unison with said respective end shutters, an illuminating device in rear of said lens, and means mounting said shutters to swing between said illuminating device and said lens.

In testimony whereof, I have hereunto signed my name.

JOHN P. HASSELBERGER.